(12) United States Patent
Mantel

(10) Patent No.: US 6,387,535 B1
(45) Date of Patent: May 14, 2002

(54) SHEET HAVING A MULTILAYER STRUCTURE

(75) Inventor: Marc Mantel, Mercury (FR)

(73) Assignee: Usinor, Puteaux (FR)

( * ) Notice: Subject to any disclaimer, the term of this patent is extended or adjusted under 35 U.S.C. 154(b) by 0 days.

(21) Appl. No.: 09/129,885

(22) Filed: Aug. 6, 1998

(30) Foreign Application Priority Data

Aug. 6, 1997 (FR) .............................................. 97 10031

(51) Int. Cl.⁷ ................................................ B21C 37/06
(52) U.S. Cl. ........................ 428/608; 428/593; 428/615; 428/638; 138/142; 138/143; 138/149; 219/137 R; 181/228
(58) Field of Search ................................ 428/615, 593, 428/608, 638; 138/142, 143, 149; 219/137 R; 181/228

(56) References Cited

U.S. PATENT DOCUMENTS

| | | | | |
|---|---|---|---|---|
| 3,786,814 A | * | 1/1974 | Armao ........................ 606/23 |
| 3,793,700 A | * | 2/1974 | Maikish et al. ................ 29/419 |
| 3,815,197 A | * | 6/1974 | Sukenik ........................ 492/42 |
| 3,895,162 A | * | 7/1975 | Lemont et al. ............. 428/608 |
| 3,948,295 A | * | 4/1976 | Lemont et al. ............. 138/147 |
| 4,287,245 A | * | 9/1981 | Kikuchi ...................... 428/34.2 |
| 4,323,620 A | * | 4/1982 | Iwabuchi et al. ........... 428/215 |
| 4,857,413 A | * | 8/1989 | Hashimoto et al. ......... 428/592 |
| 5,457,301 A | * | 10/1995 | Wilson ........................ 219/137 |
| 5,665,479 A | * | 9/1997 | Vandamme et al. ........ 428/613 |
| 5,833,853 A | * | 11/1998 | Carlson ................. 210/497.01 |
| 6,063,332 A | * | 5/2000 | Imamura et al. ............... 419/4 |

FOREIGN PATENT DOCUMENTS

| | | |
|---|---|---|
| DE | 2 201 637 | 8/1973 |
| DE | 39 35 120 | 4/1991 |
| DE | 92 03 734 | 8/1993 |
| EP | 0 486 427 | 5/1992 |
| FR | 798 302 | 5/1936 |
| FR | 2 086 225 | 12/1971 |
| FR | 2 292 181 | 6/1976 |
| FR | 2 396 868 | 2/1979 |

\* cited by examiner

Primary Examiner—Deborah Jones
Assistant Examiner—Andrew T Piziali
(74) Attorney, Agent, or Firm—Oblon, Spivak, McClelland, Maier & Neustadt, P.C.

(57) ABSTRACT

Sheet having a multilayer structure, called a sandwich sheet, composed of two rolled metal skins which are joined together by a core, in which sheet the core contains a stainless steel wool.

13 Claims, 1 Drawing Sheet

SHEET HAVING A MULTILAYER STRUCTURE

TECHNICAL FIELD

The present invention relates to a sheet having a multilayer structure, called a sandwich sheet, composed of two rolled metal skins joined together by a core. A process for making a multilayer structure also makes up part of the invention.

BACKGROUND OF THE INVENTION

Industrial sectors, especially the motor-vehicle industry, require lightweight materials, such as, for example, steel composite materials of the multilayer type, which have the properties of steel but a lower density. These multilayer materials may be used especially in the manufacture of motor-vehicle body components or of exhaust lines.

Many patents describe multilayer structures consisting of two metal skins combined with a core made of organic resin.

For example, Patent FR 90/06805 relates to a process for producing a sheet having a multilayer structure, called a sandwich sheet. Here, the sheet is obtained by a process being composed of two metal skins and a core made of polymer material, the purpose of which is to provide an acoustic or vibration damping function or to improve the stiffness-to-weight ratio. Forming this type of multilayer structure poses joining and welding problems. This is because the poor mechanical properties of the material of which the core is composed causes the material to creep during drawing. From the welding standpoint, the material of which the core is composed is an electrical insulator, thereby causing a problem in terms of conductivity in the thickness direction during welding, even when, in practice, the conductivity is improved by adding electrically conductive fillers, such as nickel balls, for example, to the material.

Patent FR 89/17142 describes a structure composed of two covering outer skins connected together by a low-density core, this core consisting of a material which is less rigid than the skins, such as, for example, a textile core hot-formed after being impregnated with a synthetic resin. The technique described in this document makes it possible to produce a composite product having a sandwich structure, of any surface area and shape, which includes regions of particular mechanical strength or of a specific property such as, for example, an acoustic, vibratory or thermal property. In the process presented in this document, the core is formed prior to the two skins being put into place, which skins are also formed before assembly.

OBJECTS OF THE INVENTION

One object of the present invention is to avoid the drawbacks of the structures described above, by providing a sheet having a multilayer structure, called a sandwich sheet, composed of two rolled metal skins which are joined together by an electrically conductive core, it being possible for the forming of the sheet to be carried out as in the case of a simple, single sheet.

SUMMARY OF THE INVENTION

One subject of the invention is a sheet having a multilayer structure, called a sandwich sheet, composed of two rolled metal skins which are joined together by a core of stainless steel wool.

Other characteristics of the invention, which may be present individually or in any combination, are:

the core consists of, consists essentially of, or comprises stainless steel wool;

the stainless steel wool occupies from 30% to 60% of the volume separating the two skins;

the skins are made of steel chosen from stainless steel, carbon steel, aluminized stainless steel and aluminized carbon steel;

the steel wool is a ferritic stainless steel wool;

the core and the two skins are joined together by welding;

the welding is carried out by capacitor-discharge arc welding;

the two skins are joined to the core by means of an adhesive;

the adhesive is chosen from a phenolic resin, an epoxy, and a polyethylene or polypropylene containing maleic anhydride.

The invention also relates to a process for producing a sheet having a multilayer structure, called a sandwich sheet, composed of two rolled metal skins joined together by a core of a stainless steel wool, in which process:

the two skins and the core are assembled by calendering, so as to define the thickness of the multilayer structure;

an arc is generated perpendicular to the surface of the skins in order to weld, in the arc zone, on the one hand, the fibers of steel wool which are in contact with each other, in the core, thereby forming a rigid network, and, on the other hand, the fibers of steel wool which are in contact with the internal surfaces of the two skins in order to ensure connection between the core and said skins.

The invention also relates to the use of a sheet in an application involving the production of a tube for a motor-vehicle exhaust line in which the sheet having a multilayer structure is rolled and welded, for example by induction welding, in order to form a tube having a double wall and a core of stainless steel wool.

BRIEF DESCRIPTION OF THE DRAWINGS

The following description and the associated figures, all given by way of non-limiting example, will make the invention clearly understood.

DETAILED DESCRIPTION OF THE INVENTION

Figure 1:
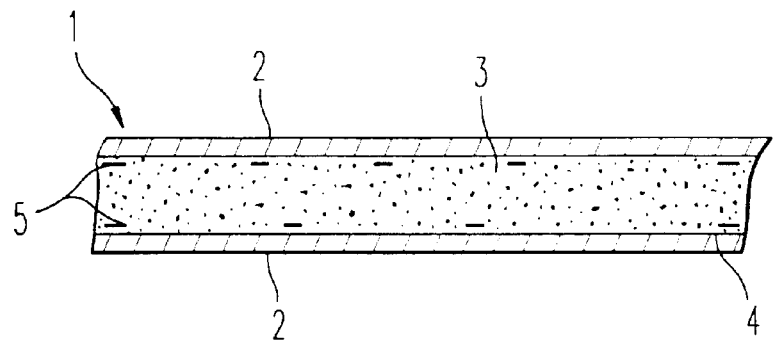
FIG. 1 shows, in cross section, a plane sheet having a multilayer structure according to the invention.

As shown in FIG. 1, the sheet 1 having a multilayer structure, according to the invention, is composed, on the one hand, of two metal skins 2, for example made of austenitic or ferritic stainless steel, the thickness of which may vary from 0.05 mm to 0.3 mm, and on the other hand, of a core 3 made of stainless steel wool.

The core 3, having a thickness of approximately 1 mm, preferably consists of ferritic stainless steel wool 4. The steel wool 4 is not limited and may be obtained by shaving, preferably in the work-hardened state, in order to increase the mechanical properties of the structure. The strands of steel wool may preferably have an average length of 70 cm and their diameter may preferably vary from 30 microns to 100 microns. Preferably, the diameter of the strands of the steel wool 4 is approximately (±10%) 60 microns. This diameter must be uniform in order to prevent embrittlement which leads to breakages.

In an application example, for the production of coiled sheet having a multilayer structure, a calendering line is used in a production process in which:

two reels are unwound in order to move two steel sheets in a parallel fashion, which sheets will form the skins 2 of the structure;

simultaneously, a web of stainless steel wool 4 is unwound onto the lower sheet, this web constituting the core 3;

the web of steel wool 4 is pressed between the two steel sheets in a calender in order to define the thickness;

the adhesion of the core 3 to the two skins 2 may be achieved by welding or adhesive bonding.

In an example of implementation by welding, an arc is generated, by capacitor discharge, perpendicular to the surface of the skins 2 in order to weld, in the arc region, on the one hand, the fibers of steel wool 4 which are in contact with each other, in the core, in order to form a rigid network, and, on the other hand, the fibers of steel wool 4 which are in contact with the internal surfaces of the two skins 2 in order to ensure connection between the core 3 and said skins 2. This example of application produces an all-steel structure which can be used at relatively high temperatures, i.e. at temperatures exceeding 500° C., in comparison with structures having, for example, an adhesively bonded core.

According to another, less expensive form of implementation, by adhesive bonding, the production process described above is used, in which process the skins are coated, in a continuous or discontinuous manner, with an adhesive such as an epoxy-type adhesive or cement. As illustrated in FIG. 1, the adhesive 5 may be distributed in spots on one of the faces of the two skins 2.

After calendering, the structure may be heated in order to cure the adhesive, such as at an average temperature of 200° C.

The adhesive 5 deposited on the two skins 2 may, by gravity and by capillary effect, penetrate the web of stainless steel wool in order to form a rigid network when the adhesive has cured. In addition, entangled fibers of steel wool also provide the structure with mechanical integrity.

In another manner of operation, it is possible to impregnate the web of metal wool with an adhesive which, at the time of calendering, will wet the internal faces of the two skins and ensure that they are adhesively bonded when the said adhesive cures. The impregnation may be carried out solely for the purpose of forming a rigid network by adhesively bonding the strands of steel wool forming the core, the adhesive being fluid and distributed in small quantities within the steel wool.

In another manner of operation, the free space between the strands of stainless steel constituting the web of wool may be filled by impregnating it with a filling material, which may be an adhesive, curing or foaming material. The stainless steel wool then acts as a support for the filling material, when the latter is still fluid or in the pasty state, before calendering and curing.

In one embodiment of the structure produced by adhesive bonding, the materials of which the skins and the steel core are composed may be different.

According to the invention, the stainless steel core, having a density of 400 g/m² for example, is formed by a disordered non-compact network of spaced-apart fibers, in which network the fibers may either by welded together in pairs, because of their contact the moment of discharge of the welding arc, or, in another embodiment of the invention, adhesively bonded to each other in pairs by a resin. This structure forms a framework linked to the two skins either during the process of welding the assembly or of adhesively bonding it.

In order to ensure mechanical integrity of the stainless steel wool, said wool is rolled so as to form a web with the desired thickness and the desired density.

Figure 2:
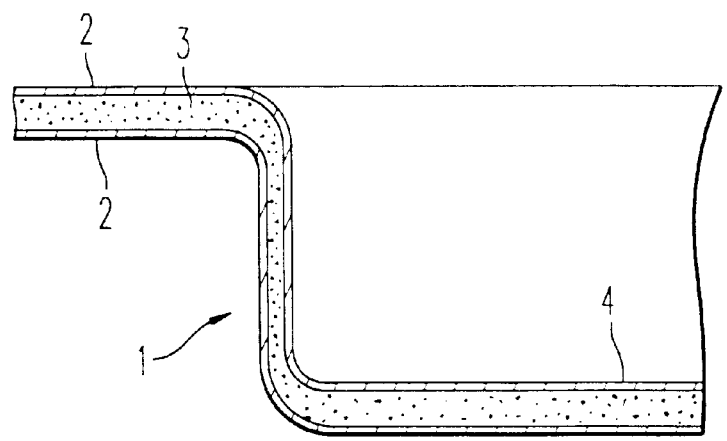
FIG. 2 shows, in cross section, a drawn shape produced by deforming the plane sheet having a multilayer structure according to the invention.

Unlike known structures, the multilayer structure according to the invention has the advantage, when a component is being formed, of generating thinner parts of the component in the regions deformed by drawing, as shown in FIG. 2, these thinner parts retaining the mechanical properties of the structure. This is because, during drawing, the stainless steel wool, in the form of a network, is compressed and withstands a load during the deformation of the structure. In a case, for example, of a cellular core of the prior art, the cells, which only have a spacing function lose their mechanical properties during compression by a buckling and folding effect.

According to the invention, the core 3 consisting of stainless steel ensures electrical conductivity between the two skins 2, thereby allowing spot welding, or any other technique to be employed.

In one application—the motor-vehicle exhaust field—it is possible to produce, for example, a tube downstream of an exhaust line.

Figure 3:
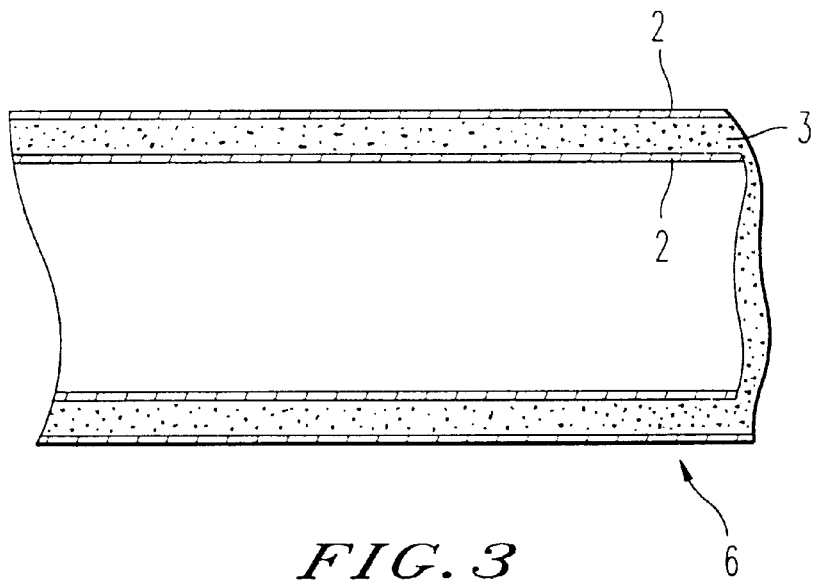
FIG. 3 is a cross section of a tube produced from the plane sheet having a multilayer structure according to the invention.

In this type of application, as illustrated in FIG. 3, the adhesive ensures cohesion of the elements of the structure, during the process of forming the tube, on the induction-welding line. After manufacturing the tube, there may no longer be adhesion of the steel wool 4 to the skins 2. The inner skin of the tube may be perforated beforehand.

The exhaust-line tube 6, formed by a double wall and a stainless steel core, provides damping of the vibrations along the entire length of the exhaust line—hence a reduction in noise—and also a heat-shield function.

The lightening of the structure makes a favorable contribution to environmental protection by reducing the vehicle's fuel consumption.

French patent application 97 10 031 is incorporated herein by reference.

What is claimed is:

1. A rigid sheet having a multilayer structure comprising two planar rolled metal skins which are joined together by a core, wherein the core comprises stainless steel wool.

2. The sheet as claimed in claim 1, wherein the core consists of stainless steel wool.

3. The sheet as claimed in claim 1, wherein the steel wool occupies from 30% to 60% of the volume separating the two skins.

4. The sheet as claimed in claim 1, wherein the skins are individually made of steel chosen from stainless steel, carbon steel, aluminized stainless steel or aluminized carbon steel.

5. The sheet as claimed in claim 1, wherein the steel wool is a ferritic stainless steel wool.

6. The sheet as claimed in claim 1, wherein the core and the two skins are joined together by welding.

7. The sheet as claimed in claim 6, wherein the welding is carried out by capacitor-discharge arc welding.

8. The sheet as claimed in claim 1, wherein the two skins are joined to the core by means of an adhesive.

9. The sheet as claimed in claim 2, wherein the two skins are joined to the core by means of an adhesive.

10. The sheet as claimed in claim 8, wherein the adhesive is a phenolic resin, an epoxy, or a polyethylene or polypropylene containing maleic anhydride.

11. The sheet as claimed in claim 9, wherein the adhesive is a phenolic resin, an epoxy, or a polyethylene or polypropylene containing maleic anhydride.

12. A process for producing a rigid sheet having a multilayer structure composed of two planar rolled metal skins joined together by a core comprising stainless steel wool, comprising:

assembling the two skins and the core by calendering so as to define the thickness of the multilayer structure;

generating an arc perpendicular to the surface of the skins in order to weld, in the arc zone, the fibers of steel wool which are in contact with each other, thereby forming a rigid network, and the fibers of steel wool which are in contact with the internal surfaces of the two skins thereby containing the core and said skins.

13. A process for the production of a tube for a motor-vehicle exhaust line, wherein a rigid sheet having a multilayer structure and comprising two planar rolled metal skins joined together by a core comprising stainless steel wool is rolled and welded, in order to form a tube having a double wall and a core of stainless steel wool.

\* \* \* \* \*